(12) United States Patent
Innocenzi et al.

(10) Patent No.: US 12,498,377 B2
(45) Date of Patent: Dec. 16, 2025

(54) BIOLOGICAL STATUS CLASSIFICATION

(71) Applicant: Randox Laboratories Ltd, Crumlin (GB)

(72) Inventors: Paul John Innocenzi, Waringstown (GB); Stephen Peter Fitzgerald, Crumlin (GB); Ivan Robert McConnell, Crumlin (GB)

(73) Assignee: RANDOX LABORATORIES LTD, Crumlin (GB)

( * ) Notice: Subject to any disclaimer, the term of this patent is extended or adjusted under 35 U.S.C. 154(b) by 1232 days.

(21) Appl. No.: 16/943,348

(22) Filed: Jul. 30, 2020

(65) Prior Publication Data

US 2021/0033618 A1 Feb. 4, 2021

(30) Foreign Application Priority Data

Aug. 2, 2019 (GB) ...................................... 1911095

(51) Int. Cl.
*G01N 33/68* (2006.01)
*G16H 10/40* (2018.01)
(Continued)

(52) U.S. Cl.
CPC ............. *G01N 33/68* (2013.01); *G16H 10/40* (2018.01); *G16H 20/60* (2018.01); *G16H 50/30* (2018.01);
(Continued)

(58) Field of Classification Search
None
See application file for complete search history.

(56) References Cited

U.S. PATENT DOCUMENTS 10,325,067 B1 6/2019 Suffin
2004/0121305 A1* 6/2004 Wiegand ............ G01N 33/5091
435/4
(Continued)

FOREIGN PATENT DOCUMENTS

WO WO 2007/127490 A2 * 11/2007 ............. G06Q 10/00
WO 2010062763 A1 6/2010

OTHER PUBLICATIONS

Jan. 16, 2020—Combined Search and Examination Report under Sections 17 and 18(3)—GB1911095_6.
(Continued)

*Primary Examiner* — David J Stoltenberg
(74) *Attorney, Agent, or Firm* — Banner & Witcoff, Ltd.

(57) ABSTRACT

There is provided a method of classifying a biological status of an individual. The method comprising: obtaining a biological sample from a patient; obtaining health-related information from the patient, said information including patient gender; analysing the sample to identify a quantity of each of 2 or more endogenous analytes in the sample; comparing the analyte quantities to reference data from healthy individuals to classify the patient as healthy, pre-diseased, at risk of disease or diseased for at least one health-related condition. The reference data includes data derived from a group of biological samples of individuals having the same gender as the patient and not having a need for medical treatment for a disease or illness, each biological sample of the group of biological samples having been analysed by the same process as used to analyse the patient sample, the process being monitored to maintain a predetermined level of consistency.

11 Claims, 3 Drawing Sheets

(51) Int. Cl.
*G16H 20/60* (2018.01)
*G16H 50/30* (2018.01)
*G16H 70/60* (2018.01)

(52) U.S. Cl.
CPC ......... *G16H 70/60* (2018.01); *G01N 2800/50* (2013.01)

(56) References Cited

U.S. PATENT DOCUMENTS

| | | | |
|---|---|---|---|
| 2005/0239213 A1* | 10/2005 | Stephens | G01N 33/5306 436/175 |
| 2011/0137136 A1 | 6/2011 | Kotanko et al. | |
| 2012/0301887 A1* | 11/2012 | Bankaitis-Davis | C12Q 1/6886 435/6.12 |
| 2013/0105684 A1* | 5/2013 | Louette | H01J 49/0031 250/282 |
| 2014/0114677 A1* | 4/2014 | Holmes | G16H 10/60 705/2 |
| 2015/0005176 A1* | 1/2015 | Kim | G16H 10/40 702/19 |
| 2016/0320381 A1* | 11/2016 | Holmes | G01N 35/10 |
| 2017/0323075 A1* | 11/2017 | Michon | G16H 50/30 |
| 2017/0329935 A1* | 11/2017 | Holmes | G01N 33/50 |
| 2017/0350903 A1* | 12/2017 | Hellerstein | G01N 33/6887 |
| 2018/0166174 A1* | 6/2018 | Lewis | G16H 50/70 |
| 2019/0010554 A1* | 1/2019 | Narain | A61P 9/04 |
| 2019/0050988 A1* | 2/2019 | Dimov | G06T 7/60 |
| 2019/0094205 A1 | 3/2019 | Sakairi | |
| 2019/0156919 A1* | 5/2019 | Magis | G16B 50/00 |
| 2019/0219599 A1* | 7/2019 | O'Bryant | G16H 20/00 |
| 2019/0242894 A1* | 8/2019 | Oved | G01N 33/60 |
| 2021/0355532 A1* | 11/2021 | Salk | G16B 30/00 |

OTHER PUBLICATIONS

Apr. 7, 2020—Search Report under Section 17(6)—GB1911095.6.
Aziz et al, Lab Medicine, vol. 50(1), 2019, Aziz et al "30-year longitudinal study of hematological parameters" pp. 64-72 available from URL https://doi.org/10.1093/labmed/lmy044 [accessed Apr. 2, 2020] See p. 65 left hand column and conclusions.
Heidari et al, International journal of endocrinology and metabolism, vol. 16( 1 ), 2018, "Insulin resistance associated with differentiated thyroid carcinoma . . . " e14545, available online at http:/endometabol.com/en/articles/14545.htm [accessed Jan. 15, 2020] See section 2 Methods.

* cited by examiner

BIOLOGICAL STATUS CLASSIFICATION

CROSS REFERENCE TO RELATED APPLICATION

This application claims priority to UK patent application number 1911095.6, titled "Biological Status Classification" and filed Aug. 2, 2019, the entire content of which is expressly incorporated herein.

FIELD OF THE INVENTION

The present invention relates to classifying the biological status of an individual. This is typically achieved through obtaining and analysing a biological sample.

BACKGROUND

Public global healthcare systems are experiencing pressure due to an increasing and ageing global population and continuing static or decreasing real-terms financial funding. An ageing population increases the number of individuals with chronic and age-related medical conditions such as Alzheimer's disease, heart disease and cancer. To compound the financial burden, most of these conditions lack a cure and are managed using hands-on healthcare support and pharmaceuticals.

In addition to this, traditional healthcare methods are reactive. This is because it is already sick individuals visiting a clinic and being treated and/or prescribed a drug. This sub-optimal healthcare provision model is being further undermined by the on-going decrease in production of novel, innovative drugs by pharmaceutical companies.

A modern vision of patient welfare is the implementation of preventative healthcare driven by improved diagnostic systems with the aim of maintaining a disease-free life (i.e. increased healthspan, the healthspan of an individual being a similar concept to a life span but relating to a disease free period of life instead of the period during which an individual is alive) through the identification of early-warning markers of pre-disease and disease. Consumers are aware of the short-comings of the current healthcare model and, wishing to take greater control of their own well-being and to pursue a disease prevention approach, have driven the proliferation of direct-to-consumer diagnostic testing services. These testing services can be broadly partitioned into imaging services, such as X-ray, ultrasound, CAT scan, MRI, and biological sample testing services in which a sample from the patient is analysed for specific components. Such biological samples include tears, saliva, interstitial fluid, urine, meconium, sputum, faeces, semen, mucous, lymph, nasal lavage, hair, and blood, and their components which are analysed include DNA, RNA, red and white blood cells, proteins, lipids, carbohydrates and various small molecules (including carbohydrates and lipids). Most consumer testing services use the biological samples to provide a limited menu of well-established analytes for which to test.

Personal fitness and nutrition awareness complement the preventative healthcare model. However, these discrete services are often pursued on an uncoordinated and individual basis. Biological sample testing is the cheapest and most practical approach to a preventative healthcare model but its implementation faces several standardisation challenges. Laboratory practice standards exist to control variability that can arise through the use of different test reagents, test methods and protocols, sample analysers, sample handling and other methods, and also the variability, albeit generally of a smaller magnitude, of the intra-analyser/reagent variability. Significant variability still exists between and within different test providers though. These disparities can lead to different clinical interpretation and ultimately can impact the individual's well-being.

Inter-individual biological variation adds a further level of uncertainty. The current standard of comparing test results of an individual to a "population norm" (such as population averages) can only be described as performing to a reasonable level. Finally, the patient data sets arising from testing require efficient, intricate and robust methods to capture, process and display the data in a consumer-readable format.

A further component of the preventative approach and the maintenance of the well-being of an individual is the identification of disease drivers and their control and removal. For example, environmental stressors were estimated to cause over 12 million deaths in 2012 (as set out in the WHO Health Statistics 2016 report). Such environmental stressors are associated with mainly cardiovascular disease (such as stroke and heart disease) and cancer, but also include respiratory diseases and infections, diarrhoeal diseases and neonatal conditions. The on-going disease burden caused by these stressors is many factors greater. Amongst the environmental stressors are environmental toxicants (ETs) such as pesticides, molecular and particulate combustion products, food additives and personal care product components, and a preventative healthcare model requires addressing the problem of ETs. Current healthcare systems do not take into account this fundamental disease driver.

A means of addressing these issues is therefore required.

SUMMARY OF INVENTION

According to a first aspect, there is provided a method of classifying a biological status of an individual comprising: obtaining a biological sample from a patient; obtaining health-related information from the patient, said information including patient gender; analysing the sample to identify a quantity of each of 2 or more endogenous analytes in the sample; comparing the analyte quantities to reference data from healthy individuals to classify the patient as healthy, pre-diseased, at risk of disease or diseased for at least one health-related condition, wherein the reference data includes data derived from a group of biological samples of individuals having the same gender as the patient and not having a need for medical treatment for a disease or illness, each biological sample of the group of biological samples having been analysed by the same process as used to analyse the patient sample, the process being monitored to maintain a predetermined level of consistency.

In a traditional healthcare model, the majority of individuals only undergo medical or biological testing when they are considered to have an illness or disease, or are developing an illness or disease. This testing is generally used as a confirmation of the illness or disease from which the individual is suffering or developing. This means that the clinical guidelines regarding quantity (also referred to as concentration) of biomarkers can have a systematic bias since the data collected regarding concentrations of biomarkers predominantly originates from individuals who have an illness or a disease, not from healthy individuals. Of course, clinical testing and trials do analyse healthy individuals from which the standard guidance is derived on healthy reference ranges for individuals. By using the method of the first aspect, the data against which the patient's results are compared originates from generally healthy individuals, i.e. from individuals not suffering from or developing a disease, who are also more comparable to the patient than the standard guidance would be. This allows the patient to have their status classified more accurately since it has a more balanced approach of taking into account healthy individuals as well as individuals with a disease or illness. This gives the reference data a broader overall perspective, which results in a more accurate classification of an individual as healthy, pre-diseased, at risk of disease or diseased as well as allowing a greater degree of precision as to where the patient is located on a scale from healthy to diseased.

The method according to the first aspect may further comprise classifying, based on the comparison, the patient as healthy, pre-diseased, at risk of disease or diseased.

In examples according to the first aspect, the data derived from the group of biological samples of individuals having the same gender as the patient and not having a need for medical treatment for a disease or illness may be used to modify predetermined boundaries between classifications of healthy, pre-diseased, diseased and/or at risk of disease. This may be based on a statistical analysis of analyte quantities of biological samples of said individuals. The predetermined boundaries may be boundaries set by medical guidance, such as medical guidelines, peer-approved literature and/or national or internationally agreed standards.

The sample may be any form of biological sample. Typically, the sample is an ex vivo sample.

The classification "pre-diseased" is intended to include illnesses where it is possible to categorise an individual as developing such a disease. Examples of this include pre-diabetes and sub-clinical atherosclerosis. The classification "diseased" is intended to include circumstances where a medical professional would diagnose an individual as suffering from a diagnosable disease or illness. The classification "at risk of disease" is intended to include situations in which an individual is considered to be on the boarder of what would be considered "diseased", or would be considered by a medical professional to have a raised likelihood of developing a disease. Additionally or alternatively, the classification "at risk of disease" is intended to include occasions where an individual whose first health check identifies a high biomarker level compared to a reference range but who, in subsequent testing, has the same level and who is proven through clinician evaluation and other tests to have a naturally higher biochemical baseline and/or occasions where an individual who has normal biomarker levels but who is positive/has a high concentration of an environmental toxicant. While the comparison of analyte quantities may only to be conducted as a comparison against reference data from healthy individuals, the comparison may also be conducted against reference data from pre-diseased and/or at risk of disease and/or diseased individuals.

The reference data may include data derived from a number of groups. For example, the reference data may include data derived from a group of biological samples of individuals having the same gender as the patient and needing medical treatment for a disease or illness.

Monitoring of the process used to analyse the sample may include calibration and/or validation testing of the process. This may include testing to independently set consistency levels. Additionally or alternatively, the monitoring may be constant or may occur according to a timetable. How the monitoring is carried out may be set/determined by an authorisation or accreditation body, such as a medical or clinical accreditation body.

When the patient is identified as being pre-diseased, at risk of disease or diseased, the relevant disease may be identified as part of the classification based on the analysis.

The analysing of the sample to identify a quantity of endogenous analytes in the sample may be identifying a quantity of 5 or more endogenous biochemicals, preferably 10 or more endogenous biochemicals, further preferably 20 or more endogenous biochemicals, still further preferably 40 or more endogenous biochemicals, and also preferably 100 or more endogenous biochemicals. The more endogenous biochemicals included in the analysis, the longer the analysis may take. However, levels of individual endogenous biochemicals within a group of biochemicals indicate a risk of disease, a pre-diseased, at risk of disease or a diseased classification. Additionally, various endogenous biochemicals relate to functionality of specific organs. Accordingly, we have found that analysing for more endogenous biochemicals allows greater insight into the patients overall health, while also providing more specific insight into various parts of the patient's body.

The biological samples of the group of biological samples may have been obtained from individuals at two or more sites, such as a healthcare site (for example a clinic). Typically, each biological sample of the group of biological samples is the biological sample obtained from individuals at a single site (such as a healthcare site or a clinic).

A move towards walk-in diagnostic patient sample testing centres on a geographically wide-scale, whether in diverse locations in a single country, or in multiple countries, brings many challenges. The provision of several diagnostic walk-in centres within a country and/or across several countries or regions must always have as its focus the accuracy and integrity of patient results, a focus challenged by potential variation within multiple areas of the diagnostic system such as sample collection methods, off-site sample testing, the analyser(s) used, data analysis methods etc. One of the most challenging aspects of patient sample testing is inter-individual variability of biochemical levels and the interpretation of these levels as to whether healthy, pre-disease, at risk of disease or disease related concentrations exist which is exacerbated if the testing is conducted on different analytical platforms and if the service is offered at geographically diverse locations. Accordingly, comparing the analysis of the patient sample with biological samples of individuals obtained at a single healthcare site allows for consistency in comparison to make the comparison repeatable and therefore reliable.

The single location may be different to the site at which the patient sample is obtained. Typically though, the single location is the same site as the site at which the patient sample is obtained. This allows local or regional influences on the biological status to be taken into account when carrying out the patient's classification as healthy, pre-diseased, at risk of disease or diseased. We have found this is able to result in a more accurate classification of the patient since individuals based in one local area or region may have a different prevailing quantity of an analyte than for individuals based in another local area or region, which if not taken into account may cause the patient to be classified differently.

Typically, the single site is in a home region of the patient. By the phrase "home region" it is intended to mean a region within which the patient is based, has their home, from which they originate, and/or in which they are resident and/or which includes the region that includes the closest site at which a sample is able to be obtained from the patient to any one of these options. This allows prevailing local or regional influences in the patient's home region to be taken into account to allow the comparison to be more specifically tailored to the patient, providing a more accurate classification of the patient.

The health-related information may include age, and the patient may be in the same age cohort of the individuals of the group of biological samples. We have found that as well as gender having an effect on how the patient should be classified, age also has an effect on how the patient should be classified. Accordingly, taking age into account allows the patient to be classified more accurately.

The endogenous analytes measured may be selected from Table 1. Typically, for glucose, sodium, cholesterol, WBC, calcium, ALT, cystatin C, CRP, AAT, total bilirubin, lipase, TAS, albumin, HbA1c, HDL, urea, insulin and magnesium the reference range values assigned to each analyte may correspond to upper and lower values of the 95% percentile calculated from biological samples of the group of biological samples. Additionally or alternatively, the reference range values assigned to each analyte of those listed in Table 1 or those specifically named in this paragraph may have upper and lower values corresponding to the mean plus or minus two standard deviations from the mean of a dataset used as a reference dataset and from which the mean is derived.

Typically the method may further comprise that when the comparison indicates the patient is pre-diseased, at risk of disease or diseased, obtaining a further biological sample from the patient after a predetermined time interval and optionally obtaining health-related information from the patient again. This allows anomalous results to be ruled out or results that may indicate the patient is pre-diseased, at risk of disease or diseased to be tracked to help identify changes, such as the patient reacting to treatment positively or negatively as well as having generally improving or declining health.

The analysis of the sample may further include measuring for one or more exogenous analytes and classifying, based upon the presence, absence or a concentration of biochemicals in the sample, the patient as disease free without exogenous contaminant, disease free with exogenous toxic biochemical, pre-disease without exogenous toxic biochemical, pre-disease with exogenous toxic biochemical, disease present without exogenous toxic biochemical or disease present with exogenous toxic biochemical. This allows the cause of the patient's classification to be known to a greater level of detail allowing any follow-up action to be tailored more specifically to a patient's needs. This provides more suitable and accurate treatment of the patient allowing treatments that would be ineffective to be ruled out earlier, potentially leading to a more rapid improvement in the patient's health.

The one or more exogenous analytes may be selected from Table 2. Exogenous analytes may include food additives and pesticides, animal pharmaceuticals, drinking water, molecular components of personal care-products and combustion products. These exogenous chemicals, many of which have been shown to be biologically harmful possessing cancer, cardiovascular disease and respiratory disease promoting properties amongst others, are not routinely measured in mainstream healthcare systems. Their measurement alongside standard endogenous biochemicals can improve pre-disease and disease diagnostics and prognostics and supports a preventative healthcare model. This is a further improvement to the current diagnostic healthcare model in which generally only endogenous biochemicals are detected and measured for disease diagnosis and prognosis instead of also including additional tests for environmental toxicants (ETs) also referred to herein as exogenously-derived biochemicals.

Typically, a patient who is classified as disease free with exogenous toxic biochemical or pre-disease with exogenous toxic biochemical may be referred to a nutritional and personal care specialist. This allows the presence of the exogenous toxic biochemical to be investigated and its presence reduced and/or removed, thereby improving the patient's health.

The analysis may be conducted using a single analyser, such as a biochemical or molecular diagnostic analyser and/or may be conducted using multiple analysers, one of more of the analysers being manufactured by a different manufacturer from one or more of the other analysers. Typically however, the analysis is conducted using a plurality of analysers, each analyser is derived from a single manufacturer. This allows for a higher level of consistency between analysers being used to conduct the analysis thereby providing greater consistency between patient results.

The reagents used during the sample analysis may be derived from a plurality of manufacturers. Typically, the reagents used during sample analysis are derived from a single manufacturer. This allows for simpler diagnosis of discrepancies between batches of reagents and for adjustments to be made, and for a greater consistency between reagents and reagent batches. This provides greater consistency in the analysis thereby greater accuracy and precision of patient classification.

Additionally, provision of biochip, clinical or molecular testing in situ using a single analyser and/or reagent manufacturer ensures a more accurate, reliable and responsive consumer healthcare testing system through reduced handling and rapid testing of samples leading to more accurate results; in-house reagent and analyser manufacturing leading to improved variable standardisation resulting in more accurate results; and rapid turnaround of results supporting an improved patient experience.

Typically, the patient sample may be obtained in a diagnostic unit, the diagnostic unit being co-located with a fitness unit and/or nutritional unit. This allows facilities relevant to a patient to be easily accessible by the patient creating a greater likelihood of uptake of treatment and response to recommendations, thereby leading to an improvement in patient health. It is intended the diagnostic unit includes the clinic or site where the patient provides the sample(s), and the diagnostic unit may or may not house the clinical analysers. Preferably, for sample integrity and speed of results turnaround, the clinical analysers are located at the diagnostic unit.

If the patient is classified as pre-diseased, at risk of disease or diseased based on the analysis, the patient may be put on a healthcare regime provided by a medical professional based on the identified quantity of one or more of the analytes. This provides the patient with suitable treatment to address their symptoms and/or address the disease which they are identified as having contracted or be in the pre-disease stages.

According to a second aspect, there is provided a method of classifying a biological status of an individual comprising: obtaining a first biological sample from a patient at a first time; obtaining a second biological sample from the patient at a second time; analysing each biological sample once each sample is obtained from the patient to identify the quantity of one or more analytes; establishing a patient reference value of at least one analyte using the identified quantity of the at least one analyte from the analysis of the first biological sample and the analysis of the second biological sample; obtaining a further biological sample from a patient at a further time; analysing the further biological sample to identify the quantity of the at least one analyte; comparing the identified quantity of the at least one analyte to the patient reference value; determining the identified quantity of the at least one analyte as anomalous if it deviates from the patient reference value by more than a predetermined amount; and classifying the patient as at risk of disease, pre-diseased or diseased if the identified quantity is anomalous.

The results of an individual's medical tests are typically compared to national or international guidelines for the relevant tests. However, this does not take account of differences between individuals. For example the quantity of an analyte naturally present in the blood or urine of one individual may be different from the quantity of that analyte naturally present in the blood or urine of a second individual. This can on occasion cause an individual to naturally have one or more analytes present, absent or at a particular quantity that puts them in a pre-diseased, at risk of disease or diseased classification according to relevant guidelines even when that individual is actually healthy. Using the method according to the second aspect allows an individual to be classified according to their own biological makeup. This provides a more accurate classification for the individual that is less reliant on guidelines that are by their nature generic or averaged across a significant population and so cannot take account of individual biological makeup.

The period between the first biological sample being obtained and the second biological sample being obtained may be one or more weeks, one or more months, six months or one or more years.

Typically, the method may further comprise updating the patient reference value based on the established patient reference value and the analysis of each further biological sample. This allows the reference value for the patient to be refined over time making smaller changes more statistically relevant whilst also taking greater account of the patient's natural fluctuations. This means it is easier to identify an anomalous result. Additionally a result that has a smaller difference than when fewer results are accounted for in the patient reference value allowing a developing disease or illness to be spotted earlier, allowing treatment to be provided sooner, thereby providing a better chance of recovery or a slowed decline.

When the patient is classified as at risk of disease, pre-diseased or diseased, disease testing to rule in or rule out the diseased, pre-diseased or at risk of disease classification may be applied, and if a diseased, pre-diseased or at risk of disease classification is ruled out the patient may be assigned a personal biochemical baseline based on the ruled out classification and the patient reference value. This further establishes the patient's own biological pattern and allows them to be treated accordingly instead of being treated as the general population would be treated with comparable initial results.

Typically, the disease testing may be one or more of a physiological test such as a treadmill test, nuclear perfusion test, or a test which uses a device that produces electromagnetic radiation or sound and is preferably one or more of ultrasound, CT scan, X-ray and MRI. The testing may be seeking to provide a positive or negative diagnosis for cardiovascular diseases such as sub-clinical atherosclerosis/atherosclerosis, cancer, pre-diabetes/diabetes and neurodegenerative diseases.

According to a third aspect, there is provided a method of classifying a biological status of an individual comprising: obtaining a first biological sample from a patient at a first time; obtaining a second biological sample from the patient at a second time; analysing each biological sample once each sample is obtained from the patient to identify a quantity of one or more endogenous analytes; comparing the identified quantity of the at least one endogenous analyte for each sample to reference data from healthy individuals or a personal biological baseline of the patient; and classifying, based on the comparison, the patient as healthy, pre-diseased, at risk of disease or diseased for at least one health-related condition for each biological sample, wherein when the patient has geographically relocated their home region between the first time and the second time, and if the patient is classified as healthy for the first biological sample and classified as pre-diseased, a risk of disease or diseased for the second biological sample, further analysing the second biological sample to identify one or more exogenous analyte. This allows external stressors to be identified that a patient has been exposed to as part of their relocation.

If the comparison is carried out against the personal biological baseline of the patient, this personal biological baseline may be established using the method according to the second aspect. The first and/or second (and/or third) biological samples obtained as part of the method of the third aspect may be used as some or all (such as one or more) of the biological samples used in the method according to the second aspect to establish a patient reference value and/or a personal biochemical baseline for the patient.

When using a personal biochemical baseline established with biological samples obtained at three or more different times, statistical analysis may be carried out on the quantity of one or more of each analyte identified in the analysis generating a standard deviation the each respective quantity. A comparison of the identified one or more analyte quantities form the analysis of the second biological sample may be carried out against the standard deviation to classify the patient as healthy, pre-diseased, at risk of disease or diseased based on the comparison. This allows the patient to be identified as having results in an "out of normal" (i.e. non healthy) range based on their personal biochemical baseline. The comparison may be conducted against the standard deviation in any suitable form. Typically the comparison against the standard deviation may be carried out by comparing the quantity of one or more analytes against a reference range with a maximum of the respective mean quantity plus 2 standard deviations and with a minimum of the respective mean quantity minus 2 standard deviations.

The geographical relocation may be on the scale of regional relocation or further, but could be between towns within a region.

The first biological sample and the second biological sample may be obtained from the patient at different locations.

A third biological sample may obtained from the patient at a third time, the third time being between the first time and the second time, the third biological sample being analysed to identify a quantity of at least one endogenous analytes, the second sample being obtained from a different geographic location form a geographic location where the first and third biological samples are obtained. The first and third biological samples may be obtained from the patient at the same location or at different locations.

The reference data from healthy individuals may include endogenous analyte reference data derived from healthy individuals of the same gender as the patient and from biological samples obtained from individuals at the same location as the location at which the first biological sample is obtained from the patient. This allows improved accuracy and precision of the classification of the patient.

The method of the third aspect may further comprise that if one or more exogenous analytes is analysed, comparing the identified quantity of at least one exogenous analytes to exogenous reference data from healthy individuals, classifying, based on the comparison, the patient as healthy, pre-diseased, at risk of disease or diseased for at least one exogenous health-related condition, and wherein if the patient is classified as pre-diseased, at risk of disease or diseased, implementing remedial action, the remedial action comprising one or more of administering an exogenous toxic chemical-sequestering drug, avoiding a source of the at least one exogenous toxic chemical or removing the exogenous toxic chemical. This allows the patient to receive appropriate treatment for the exogenous toxic chemical they have been exposed to due to their relocation.

BRIEF DESCRIPTION OF FIGURES

Example methods of classifying biological status are described below in relation to the figures, in which.

DETAILED DESCRIPTION

Figure 1:
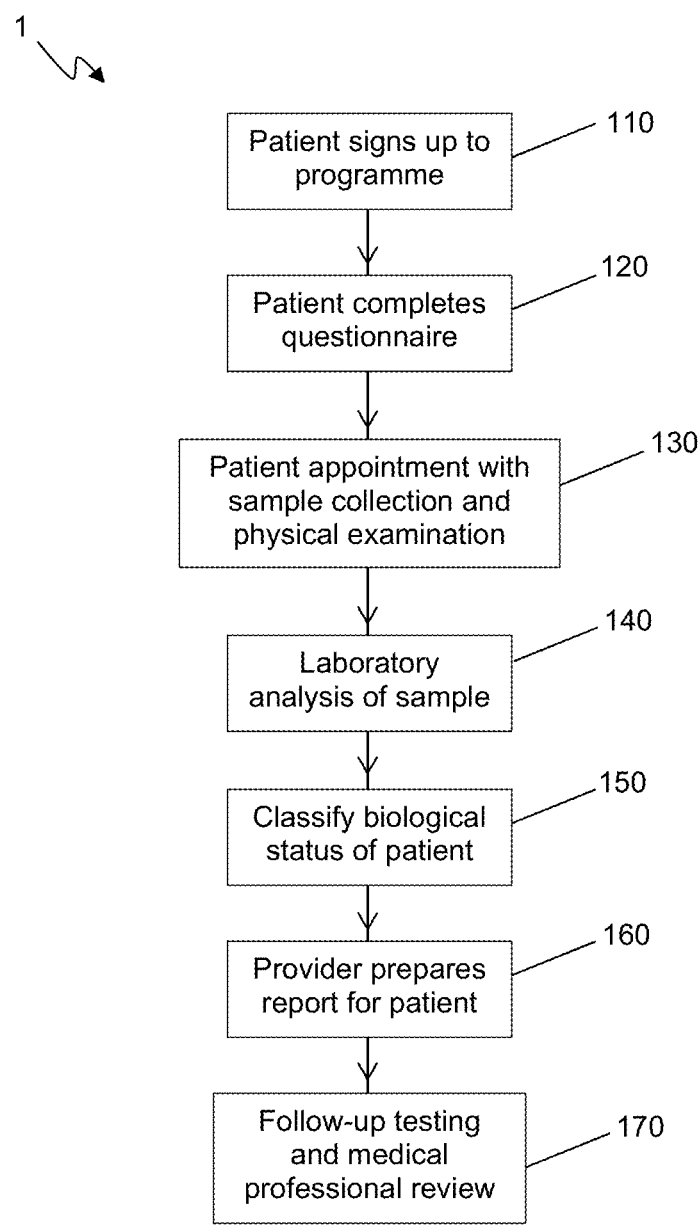
FIG. 1 shows a flow diagram of a process for classifying biological status.

A process used to classify the biological status of an individual (also referred to as a "patient") is generally illustrated at 1 in FIG. 1.

Initially, the patient signs up to the programme to have their biological status classified (step 110). In preparation for the patient's attendance of a clinic, a personal medical lifestyle questionnaire (PMLQ corresponding to "health data" or "health-related information") is completed (step 120). In this example, this includes questions regarding medical history, such as historical medication use, diseases and family disease history, lifestyle, gender, age, weight, height, BMI, blood pressure, alcohol intake, smoker/non-smoker and personal details, such as address and occupation. Additionally, the lifestyle portion of the PMLQ may ask about alcohol and drug consumption and exercise quantity, frequency and type. The PMLQ may be completed online, in person or in an interview with a member of staff at the clinic the patient is attending as part of the programme.

The patient attends an appointment (at a clinic) during which a sample is collected from the patient and a physical examination is conducted (step 130). In this example the sample is a biological sample in the form of blood and urine, each of which is collected from the patient by a conventional process. In other examples, the sample may be tears, saliva, interstitial fluid, meconium, sputum, faeces, semen, mucous, lymph, nasal lavage, and/or hair instead of, or in addition to, blood. The physical examination typically includes measuring weight, height, blood pressure, body fat measurements, reflex measurements and other calculated and reflex tests. In this example, the physical examiner is optional for classifying the biological status of the patient. This can be in place of some of the information in the PMLQ and can still be included as health-related information.

Once the patient sample is collected, this is transferred to a laboratory for analysis (step 140). The process and details of the analysis conducted is set out in more detail below. As a brief summary, the samples are processed and analysed using clinical analysers from various manufacturers mainly at a central processing laboratory or on-site. In this example, the analysis identifies the quantity of two or more endogenous analytes in the patient sample and/or the presence or absence of two or more analytes in the patient sample.

On completion of the analysis the biological status of the patient is classified. This classification includes the biological status classification of the patient as healthy, pre-diseased, at risk of a disease or diseased. The classification may also include a classification of at risk of disease. In some examples this classification is provided for each endogenous analyte. The classification includes comparing the analysis of the patient sample against reference data from healthy, pre-diseased, at risk of disease and/or diseased individuals. The reference data includes data derived from a group of biological samples of individuals of the same gender as the patient and that are healthy (i.e. that do not have a need for medical treatment for a disease or illness). In this example, the same process as used to analyse the patient sample was also previously used to analyse each biological sample of this group of biological samples. The comparison to reference data is described in more detail below.

When the classification is complete, the results are optionally compiled into a report by the provider of the programme (step 160).

Should the patient be classified as pre-diseased or diseased (or at risk of disease), the patient is offered follow-up tests and a review with a medical professional, such as a doctor (step 170). This step is optional. However, depending on the classification a medical professional may make a strong recommendation as to how the patient should proceed with medical treatment and/or may issue a prescription or a referral on to a medical specialist to the patient for the patient to be treated.

As a summary of steps 140 to 170, the analysis data output is compared to standard reference ranges (for example as per described on the data-sheet provided by the test provider) and is amalgamated with the questionnaire data, individual physical data, such as height, weight and physiological measurements, such as blood pressure. The total dataset is processed and presented as a hard-copy and/or electronic document to the patient. If biochemicals are found to be outside of the standard reference ranges the individual is either recommended to visit a general practitioner or is provided with health advice within the clinic and returns to the clinic at a later date for further sample testing of the out-of-range biochemicals.

Turning to the analysis conducted in step 140, example data is set out below that demonstrates the analysis conducted in the examples described herein.

Endogenous Analysis Methods and Examples

The data in the examples (Examples 1 to 4 below) is drawn from patient blood and urinary samples that were collected at Randox Health UK Clinics in Crumlin & Holywood (NI), Liverpool (Liv) and London (Lon). Biochemicals were analysed at Randox Health Holywood, Randox Health London, Randox Health Liverpool and Randox Clinical Laboratory Services in Antrim. Analysers used for measuring biochemicals were Randox Imola, Randox Evolution, Sysmex XS1000i, Roche e801, Roche Urisys 1100 and Siemens Immulite 2000XPi. White blood cells (WBC) and glucose were measured on a Roche Urisys analyzer in a single laboratory (Antrim, NI). Insulin, folic acid, myoglobin and Vitamin B12 were measured on a Roche e801 analyser in the same laboratory (NI). Alanine aminotransferase (ALT), alkaline phosphatase (ALP), aspartate aminotransferase (AST), gamma glutamyltransferase (GGT), creatinine kinase (CK Nac), albumin, ferritn, total bilirubin, total antioxidant status (TAS), pancreatic amylase, lipase, creatinine, cystatin C, rheumatoid factor (RF), calcium, magnesium, sodium, urea, uric acid, C-reactive protein, triglycerides, HDL, HbAc1, cholesterol, immunoglobulin G (IgG), immunoglobulin E (IgE), iron, antistreptolysin O (ASO) and transferrin were measured on a Randox Imola analyser in different laboratories (NI, London & Liverpool). *H. pylori* was measured on a Siemen's Immulite 2000XPi analyser in a single laboratory (Antrim, NI). Vitamin D, thyroid stimulating hormone, free thyroxine (FT4) and free tri-iodothyronine (FT3) were measured on a Randox Evolution analyser in different laboratories (NI, London & Liverpool). Biochemicals measured are displayed in Table 1. Each analyser is used in its standard manner without modification.

TABLE 1

| Analyte | Organ/System/Condition Assessed |
|---|---|
| Glucose | Diabetes |
| Albumin | Liver, Kidney, Infection & Inflammation, Nutrition |
| HbA1c | Diabetes |
| HDL | Heart |
| Sodium | Kidney |
| Cholesterol | Heart |
| WBC | Blood |
| Calcium | Kidney, Bone, Nutrition |
| Creatinine | Kidney |
| ALT | Liver |
| Urea | Kidney |
| Cystatin C | Kidney |
| CRP | Heart, Infection & Inflammation |
| AAT | Infection & Inflammation |
| GGT | Liver |
| Total bilirubin | Liver |
| Lipase | Pancreas |
| TAS | Nutrition |
| H. pylori | Digestion |
| Ferritin | Liver, Iron Status, Infection & Inflammation |
| CK Nac | Heart, Muscle |
| Insulin | Diabetes |
| FT4 | Thyroid |
| IgG | Infection & Inflammation |
| Magnesium | Kidney, Nutrition |
| TSH | Thyroid |
| Vitamin D | Bone & Nutrition |
| IgE | Allergy |
| Myoglobin | Heart, Muscle |
| Uric acid | Kidney, Joints |
| ASO | Infection & Inflammation |
| Vitamin B12 | Nutrition |
| Rheumatoid factor | Autoimmune, Joints, Infection & Inflammation |
| Iron | Nutrition, Iron Status |
| Transferrin | Iron Status |
| AST | Liver |
| Folic acid | Nutrition |
| FT3 | Thyroid |
| Pancreatic amylase | Pancreas |
| ALP | Liver, Bone |

Exogenous Analysis Methods and Examples

In addition to the endogenous analytes and analysers used to test for these identified above, in some examples, environmental toxicants (ETs) and exogenously-derived biochemicals are included in the analysis. This is because a total health approach to preventative diagnostic healthcare requires an assessment of environmental impacts. For example, environmental insults in the form of pathogen exposure, chemical and particulate exposure originating from vehicle and industrial emissions (especially from fossil fuels), industrial plant effluent, drinking water, food additives and components, components of personal care products etc are known to be disease drivers. Additionally, the area of the digestive tract has been estimated to be upwards of 30 square meters ($m^2$) which represents a significant area of potential absorption of food components which includes a multitude of synthetic chemical additives derived from processed foods. Further environmental toxicant exposure occurs through the respiratory system especially in the form of fossil fuel combustion products (especially particulates and their adsorbed toxic molecules) and through components of personal care products via the skin. Finally, environmental exposures contribute to approximately a quarter of global disease burden ((Pruss-Ustun et al. 2017, J Public Health 39(3):464-475)

In the examples described herein, an ET implies any biologically detrimental molecular species, whose origin includes vehicle and industrial emissions (especially from fossil fuels), industrial plant effluent, drinking water, food additives and components, (molecular) components of personal care products, volatile components of packaging and household furniture and items, pathogens (e.g. bacterial proteins) and fungi (e.g. mycotoxins). An ET analysis would therefore provide the patient with information relating to possible conditions related to toxicant exposure.

As small molecules are generally metabolised enzymatically in the liver and excreted via the kidneys over relatively short durations spanning hours/days, the detection of parent and metabolites in the urine provides an indication of recent environmental toxicant exposure. Additionally, detection using a sample type such as hair allows for detecting longer-term exposure. As such, in some examples, hair is collected from the patient. Detection of ETs enables the individual to take remedial and/or preventative measures. A key value component of ET testing is in disease prevention through individual action following the detection of toxicants in the local environment.

The methods used to detect the ETs could utilise any suitable analytical technique such as infra-red absorption spectroscopy (including Raman), protein and carbon nuclear magnetic resonance, UV absorption spectroscopy, atomic absorption spectroscopy, mass spectroscopy (linked to gas chromatography or liquid chromatography), an immuno-based detection technology such as a clinical analyser such as the Randox Evidence Investigator, Randox Evidence Multistat, Evidence or Evidence Evolution which can benefit from simultaneous multi-analyte analysis using biochip array technology (BAT). Such a technique would facilitate the efficient and accurate measurement of many ETs.

Target ET groups and their analytes are set out in more detail here:
Pesticides

Matrices to test include biological samples and environmental sampling (house/garden air samples and drinking water samples). Reduction/prevention measures could include organic diet, mask wearing, water filtration.
Persistent Organic Pollutants (POPs)

Matrices to test include biological samples and drinking water. POPs are a well-defined list of environmental toxicants as cited by the Stockholm Convention. These are stable synthetic molecules with a high biological half-life which accumulate over time and can arise from both distant (airborne derived/water derived land run-off) and local sources. The airborne molecules can be the gaseous molecule or trapped on particulates. Molecules such as polychlorinated dioxins and dibenzofurans originate mainly from incineration and combustion processes and are absorbed into the body through food and polluted air. Detection of such chemicals could suggest long-term ingestion if point testing of drinking water and food is negative, and therapeutic sequestration could, if possible, be initiated. Target POPs include aldrin, chlordane, dieldrin, endrin, heptachlor, mirex, toxaphane, polychlorobiphenyls (PCBs), DDT, dioxins & polychlorinated dioxins, di benzofuran & polychlorinateddibenzofurans, chlordecone, hexachlorocyclohexanes, polybrominated diphenyl ethers, pentachlorobenzene, perfluorooctanesulphonic acid, endosulfans and hexabromocyclodecane. Reduction/prevention measures could include low fat diet, mask wearing, relocation.

Fuel and Fuel Combustion Vapour

Matrices to test include environmental (mask or air sampling device) and/or biological sample. These include diesel, petrol & jet oil, Volatile Organic Compounds (VOCs) from neat fuel and combustion products. Possible testing targets include dibenzofuran and dibenzothiazole (known combustion products in petrol and diesel). Testing of residential (VOC's, pesticides) and food additives/packaging toxicants although potentially providing the benefit of novelty/exclusivity of testing and possible IP protection of toxicant sampling devices, are more difficult to mitigate against (although see Dyson Ltd product launch of the Dyson Pure Cool™, which on 30 Jul. 2019 is identified by Dyson Ltd as removing 99.95% of air allergens and pollutants as small as 0.1 μm), whereas detection of water pollutants and pesticides can be subsequently acted upon by individuals through water filtering, the purchasing of organically produced foods and keeping windows closed during spraying season. Similarly, for the inhabitants of cities and large towns, fuel combustion toxicants can be countered through mask wearing.

Workplace/Residential Contaminants

Matrices to test: environmental mask or air sampling device for volatile organic compounds (VOCs) and/or biological samples. This could include a pesticide screen if dwelling/building located near agriculture and fuel combustion pollutants.

Food Additives, Personal Care Products (PCPs) & Packaging Leachants

Matrices to test include biological samples, such as US registered food additives, which number approximately 10,000 compounds; and notable package leaching chemicals including bisphenol A and phthlalates. These include bis(2-ethylhexyl)phthalate and dibutylphthalate ("plastics"), the paraben class of preservatives.

For PCPs, there have been numerous animal studies suggesting damaging biological effects. Some PCP using companies have phased out such compounds while others are attempting to source alternatives. Detection of these compounds in biological samples would enable the patient to take an informed decision whether to source alternative PCPs lacking the chemicals in the target list.

Miscellaneous

Heavy metals. These are analysed in most Target Groups e.g. air-derived attached to particulates, drinking water and biological samples. To implement a testing system that prevents disease and due to the rapid clearance by the body of certain xenobiotics (in the current context a xenobiotic is a non-endogenous small molecule although the standard definition includes high levels of endogenous small molecules). Analysing both biological samples and environmental samples is considered the optimal approach.

It is also possible to identify exposure to environmental toxicants by measuring a proxy biomarker. For example, the current inventor has identified that the protein thrombomodulin is raised in the urine of individual exposed to various environmental toxicants (see WO 2016/120633 A1). The environmental toxicants identified in the study include 1-dichloroethane, β-naphthylamine or 2-naphthylamine, 4,4'-methylenebis (2-chloroaniline) MOCA, 4-aminobiphenyl, aromatic amines, arsenic, auramine, benzidine, xenylamine, benzidine-derived dyes, aniline and azo dyes, benzo(a)pyrene, chlordimeform/4-COT, coal tars, direct black 38, direct blue 6, direct brown 95, nitrobiphenyl, o-toluidine, PAHs, tobacco smoke, carbaryl, chlorination byproducts, chlornaphazine, chlorophenols, creosotes, methylenedianiline, propoxur, solvents, trihalomethanes, antimony, asbestos, bifenthrin, cacodylic acid, carbamates, chromium, nickel, leather dust, cadmium, dichloropropene, diesel exhaust, dioxins/TCDD, lead, nitrosamines, o-phenylphenol, organochlorine pesticides, p-cresidine, pesticides, pyrethins/pyrethroids, saccharin, tetrachloroethylene (PCE), phenyl β-naphthylamine, 2-mercaptobenzothiazole, solvent red 164 as dye penetrant, solvent red 19 as dye penetrant or anti-rust agent, dinitrotoluenes, diazo printing ink and derivatives or combustion products of fossil fuels, antineoplastic drugs such as cyclophosphamide, cisplatin and ifosfamide, diabetic medications such as pioglitazone, metformin and glimepiride, and pain killers such as paracetamol, phenacetin and ibuprofen, and are incorporated in the current invention as targets to be incorporated in a wellbeing environmental toxicant screen.

Table 2 below lists some common ETs for which analysis is conducted in some examples.

TABLE 2

Personal care products

| Name | Structure |
|---|---|
| Bisphenol A | 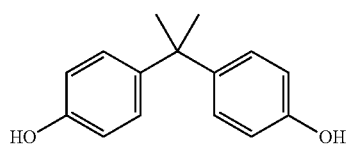 [SMILES: CC(C)(c1ccc(O)cc1)c1ccc(O)cc1] |

TABLE 2-continued

Personal care products

| Name | Structure |
| --- | --- |
| Phthalates (Me, Et, diethyl, tBu) | (phthalate diester structure with OR and OR' groups) |
| Parabens (Me, Et) | (methyl paraben structure) |
| Bisphenol A bis(2,3-dihydroxypropyl)ether | (BPA bis-glycidyl ether diol structure) |
| 2,4-dihydroxybenzophenone (BP-1) | (BP-1 structure) |
| 2-hydroxy-4-methoxybenzophenone (BP-3) | (BP-3 structure) |
| Benzophenone-4 | (benzophenone-4 sulfonic acid structure) |
| Octyl methoxycinnamate (OMC or octinoxate) | (octinoxate structure) |
| Triclosan | (triclosan structure) |

TABLE 2-continued

| Personal care products | |
|---|---|
| Name | Structure |
| Triclocarban | [structure: 3,4-dichlorophenyl-NH-C(=O)-NH-4-chlorophenyl] |

| Bisphenol replacements | |
|---|---|
| BP-A | [structure: 2,2-bis(4-hydroxyphenyl)propane] |
| BP-F | [structure: bis(4-hydroxyphenyl)methane] |
| BP-B | [structure: 2,2-bis(4-hydroxyphenyl)butane (Me, Et on central C)] |
| BP-E | [structure: 1,1-bis(4-hydroxyphenyl)ethane (Me, H on central C)] |
| BP-S | [structure: bis(4-hydroxyphenyl)sulfone] |
| HPP | [structure: 1-(4-hydroxyphenyl)-1-phenylethane, with stereochemistry] |
| 4,4-dihydroxybenzophenone | [structure: bis(4-hydroxyphenyl)ketone] |

| Urban water cycle contaminants | |
|---|---|
| Metaldehyde | [structure: cyclic tetramer of acetaldehyde, 2,4,6,8-tetramethyl-1,3,5,7-tetraoxocane] |

TABLE 2-continued

Personal care products

| Name | Structure |
|---|---|
| Carbendazim | |
| MCPA | |
| Dimethyl tetrachloroterephthalate | |
| Oxadixyl | |
| Pendimethalin | |
| Carbetamide | |
| Mecoprop | |
| Propyzamide | |

TABLE 2-continued

| Personal care products | |
|---|---|
| Name | Structure |
| Triclopyr | (structure) |
| Quinmerac | (structure) |
| Chlorpyrifos | (structure) |
| Fluoxpyr | (structure) |
| Chlortoluron | (structure) |
| Metoxuron | (structure) |
| 2,4-D | (structure) |

| Persistent organic pollutants (POPs) | |
|---|---|
| Endrin | (structure) |

TABLE 2-continued
Personal care products
| Name | Structure |
|---|---|
| Heptachlor | 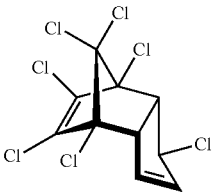 |
| Toxaphene | 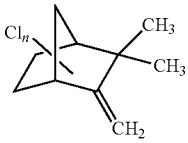 |
| Aldrin | 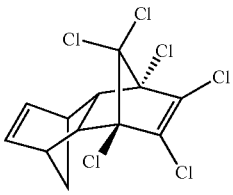 [SMILES: ClC1=C(Cl)[C@]2(Cl)C3C4C=CC(C4)C3[C@@]1(Cl)C2(Cl)Cl] |
| Chlordane | 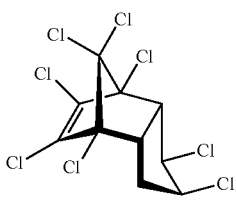 |
| Dieldrin | 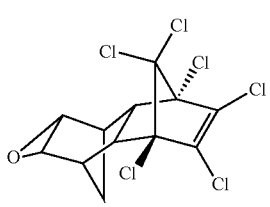 [SMILES: ClC1=C(Cl)[C@]2(Cl)C3C4CC(C5OC45)C3[C@@]1(Cl)C2(Cl)Cl] |
| Mirex | 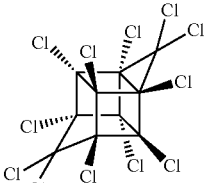 |
| Chlordecone | 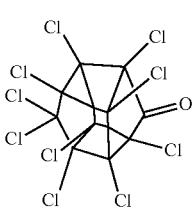 [SMILES: O=C1C2(Cl)C3(Cl)C4(Cl)C(Cl)(Cl)C5(Cl)C6(Cl)C1(Cl)C61C2(Cl)C43C51Cl] |
| PCBs | 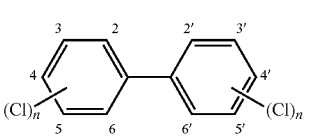 |

TABLE 2-continued

| Personal care products | |
|---|---|
| Name | Structure |
| Polychlorinated DBFs | |
| PBDEs | |
| PBBs | |
| Hexachlorobutadiene | |
| Lindane | |
| DDT | |
| Pentachlorobenzene | |
| Hexachlorobenzene | |
| Pentachlorophenol | |

TABLE 2-continued

Personal care products

| Name | Structure |
|---|---|
| PFOSA | [structure of perfluorooctanesulfonamide/perfluorooctanesulfonic acid with SO₃H group] |
| Endosulfan | [bicyclic structure with Cl substituents and sulfite ester] |
| Hexabromocyclodecane | [cyclododecane ring with six Br substituents] |
| PCN | [naphthalene with $Cl_m$ and $Cl_n$ substituents] |
| PCDBs | [dibenzodioxin structure with $Cl_n$ and $Cl_m$ substituents] |

Analysis Consistency

Clinical tests for biochemicals are well known in the art and include immunoassay and enzymatic based testing. These tests invariably use multiple components in the testing protocol such as antibodies, enzymes, signalling molecules, buffers and reagents which can be sourced from multiple companies. Under such circumstances, the test manufacturer is thus dependent upon these multiple manufacturers for the supply and integrity of the reagents used to develop the test and has no control on such parameters as availability, quality and reliability (inter-batch variation) of the reagents which ultimately affects the precision and accuracy of the developed test. It is therefore important to monitor consistency to allow results to be comparable. Additionally, in some examples, all analysers and/or reagents used in the analysis are derived, sourced or obtained from a single manufacturer.

In the examples described herein consistency in analysis is achieved by regular calibration, validation and equivalence testing. This may include testing up to a nationally set standard. Additionally, since multiple sites may be used to carry out testing, the standard the analysis adhered to may be a multi-site accreditation, such as the accreditation of multi-site laboratories standard set by the United Kingdom Accreditation Service (UKAS).

The calibration, validation and equivalence testing are each separate testing regimes. For calibration, the analysers and/or reagents are usually tested against a recognised reference standard analyte or sample to ensure the same results are achieved. For validation, analysers and/or reagents are tested against a sample of unknown content (although the content is generally known by the provider of the sample to allow results to be confirmed) to ascertain whether the results are as expected from the sample. For equivalence testing, the analysers and/or reagents are then assessed to see how much results of a sample deviate by between analysers and reagent lots and batches to allow adjustments to be made to remove or account for analysers or reagents providing deviating results.

Reference Data of Healthy Individuals

As set out above, in the example of FIG. 1, as part of the classification process, a comparison of the results of the analysis of the patient sample to results of healthy individuals is conducted. This allows the boundaries between the various categories (such as healthy, pre-diseased, diseased, and optionally at risk of disease) to be adjusted in light of results obtained from healthy individuals, as well as from guidelines, which, as outlined above, are generally derived based on test results from cohorts of healthy individuals developed from data derived from clinics and/or hospitals based, as well as possibly from individuals already suffering from an illness or disease. In the examples described herein the standard reference ranges that may be applied may include a healthy range stated in details provided in "Information for Use" datasheets that are provided from the manufacture of the tests being used in the analysis of the patient samples. This differs from research studies which compare biomarker levels in healthy cohorts to biomarker levels in diseased cohorts.

In the example of FIG. 1, the output from the analysis, namely the analyte quantities, is compared to reference data. The reference data includes data derived from biological samples of individuals of the same gender as the patient. This is able to be ascertained from the health-related information gathered as part of the PMLQ. In this example, the biological samples of these individuals have undergone the same process to analyse the respective samples as the process used to analyse the patient sample. The process is therefore monitored for consistency as set out above, which means the results are reliably comparable.

In this example, the data derived from the group of biological samples of individuals having the same gender as the patient and not having a need for medical treatment for a disease or illness is used to modify predetermined boundaries between classifications of healthy, pre-diseased, diseased and/or at risk of disease. The modification of the boundaries is based on a statistical analysis of analyte quantities of biological samples of the individuals from which the biological samples were obtained.

Example 1 below sets out how using data from individuals allows the boundary between classifications to be adjusted.

Example 1

Using blood and urine as samples obtained from a group of individuals at Randox Health clinics and analysed as outlined above, concentrations of Cystatin C in the samples were analysed. The concentration corresponds to quantity of Cystatin C. The concentration is measured in milligrams per litre (mg/L). The standard reference range for a healthy individual used for Cystatin C is 0.57 mg/L to 1.05 mg/L (as per the datasheet accompanying the manufacturer's test). Cystatin C concentration is used to evaluate renal function and possible kidney decline (CKD).

For samples with concentrations within the standard reference range, an individual from which the sample is obtained is considered to be healthy. Outside of this range, the individual is considered to be pre-diseased or diseased.

We have found that by from a cohort of healthy individuals of 2984 males and 2004 females the statistical results set out in Table 3 is obtained:

TABLE 3

| Statistic | Male Cystatin C conc. (mg/L) | Female Cystatin C conc. (mg/L) |
|---|---|---|
| Mean | 0.772 | 0.717 |
| Standard deviation (SD) | 0.143 | 0.157 |
| Median | 0.750 | 0.690 |
| 5% percentile | 0.600 | 0.540 |
| 95% percentile | 1.020 | 0.980 |

For a modified reference range the mid-point of the healthy range is taken as the mean value. The minimum and maximum of the healthy range is accepted within medical and clinic fields as being bounded by the 5th and 95th percentile or two standard deviations from the mean. (Sinton et al., 1986, Clin Chem, 32:76-79). Accordingly, we have found that the reference range for males applying the 5th and 95 percentile may be modified to 0.600 mg/L to 1.020 mg/L and the reference range for females may be modified to 0.540 mg/L to 0.980 mg/L, or applying the mean+/−2SD as outlined in Table 3. The 5th and 95th percentile is preferable given the non-normal distribution of the cystatin C data.

These modified reference ranges provide a more precise minimum and maximum than the standard range. Additionally, these ranges provide a different male and female range allowing male and female patients to be assessed under different criteria appropriate to their differences instead of against a generic range that may not fully represent them. Finally, the modified female range can be seen as having a lower maximum, meaning a female patient that was found to have a Cystatin C concentration of 1.040 mg/L would have been considered healthy against the standard range. However, when taking into account the cohort of healthy individuals and the modified range, this patient would be considered to be outside of the healthy range, and would therefore benefit from further tests to assess their health.

Statistical analysis for each of examples 1 to 4 was performed using the software programs SPSS and Graphpad Prism.

Geographic Reference Data

Increasing the accuracy and precision of biochemical measurements is a fundamental on-going process in clinical chemistry healthcare. A key component of this process is the delivery of more accurate reference data with which to compare patient measurements. It has been found that a more accurate biological status can be ascribed to a patient by establishing geographically more constrained reference data to multiple biochemicals.

As demonstrated in the examples below, it has been found that geographically-specific reference ranges for certain clinically-relevant endogenous biochemicals enables a more accurate assessment of the health of the individual. Standardisation and increased results accuracy of the geographically-adjusted testing example described herein also enables ready integration into the existing public healthcare system in various countries, such as the UK and in other countries. UK National Health Service (NHS) hospitals in different local authorities areas do not routinely conform to a single standard of testing. Additionally, sample testing protocols vary between hospitals throughout the UK. This inevitably makes inter-hospital comparisons difficult, especially for an individual who re-locates from one region to another and therefore who has test results from two different hospitals. Some examples mitigate this problem as the communication infrastructure in place enables a patient initially tested at a first location to be tested at a second location and the results of both tests to be compared to a reference value derived from the first location.

In some examples, the analyte quantities from the patient sample are compared against biological samples from healthy individuals obtained at the same site, such as the same clinic or medical facility in which the patient sample is obtained. This allows the patient to be classified relative to classifications for individuals that prevail locally, instead of classifications that are generally applied as a standard or across a number of sites. This is applied in some examples because we have found that the population in a geographic location has a slightly different physiology from the population in another geographic location. Accordingly, the reference ranges used to classify the patient are able to be modified to take into account local factors. This is achieved by a statistical analysis of biological samples obtained from individuals in different geographical locations.

Should a patient have a particular geographic location in which they are resident (in other words a "home location"), then the biological sample data of other individuals obtained closest to this geographic location is likely to be the most relevant for endogenous analytes. Accordingly, in some examples, a patient's analysis results may be compared with biological samples obtained from healthy individuals in the patient's home location, or in a location as close as possible to the patient's home location (it is intended that a patient's home location will encompass the location where the nearest site for collection of samples). If a patient relocates or visits another geographic location and has a sample obtained at that location (or at the closest site to that location), then in some examples when a patient sample is obtained in a location other than their home location, the analysis results of the sample are compared with biological samples of healthy individuals obtained in the patient's home location. Additionally or alternatively, in some examples when a patient sample is obtained in a location other than their home location, the analysis results of the sample are compared with biological samples of healthy individuals obtained in the location where the patient sample is obtained. This last option may be most suitable for analysing exogenous analytes since it is the exogenous analytes in the location where the sample is obtained that are most likely to affect the health of the patient.

In some examples, the data derived from the group of biological samples of individuals having the same gender as the patient and not having a need for medical treatment for a disease or illness and obtained at the same location as the location in which the patient is obtained may be used to modify predetermined boundaries between classifications of healthy, pre-diseased, diseased and/or at risk of disease. The modification of the boundaries is based on a statistical analysis of analyte quantities of biological samples of the individuals from which the biological samples were obtained.

Examples 2 and 3 below set out how using data from individuals obtained in particular locations allows the boundary between classifications to be adjusted.

Example 2

Using blood and urine as samples obtained and analysed as outlined above, the analytes set out in Table 1 were analysed. The samples were obtained in Randox clinics in Northern Ireland, Liverpool and London for individuals made up of males (up to 5900 samples per analyte) and females (up to 3700 samples per analyte). The results are presented below in Table 4 for males, Table 5 for females and Table 6 for a comparison between males and females at each location.

TABLE 4

| ANALYTE | P Value | K-W statistic | NI v Lon | NI v Liv | Lon v Liv |
|---|---|---|---|---|---|
| Glucose | 0.0001 | 267.9 | *** | *** | *** |
| Albumin | 0.0001 | 98.92 | *** | *** | ns |
| HbA1c | 0.0001 | 93.11 | *** | ns | ns |
| HDL | 0.0001 | 83.05 | *** | *** | ns |
| Sodium | 0.0001 | 74.81 | *** | *** | *** |
| Cholesterol | 0.0001 | 73.06 | *** | * | * |
| WBC | 0.0001 | 69.21 | *** | ns | *** |
| Calcium | 0.0001 | 65.8 | *** | *** | *** |
| Creatinine | 0.0001 | 63.12 | *** | *** | *** |
| ALT | 0.0001 | 60.15 | *** | ns | *** |
| Urea | 0.0001 | 57.22 | *** | *** | ns |
| Cystatin C | 0.0001 | 51 | *** | ns | *** |
| CRP | 0.0001 | 44.84 | *** | ns | *** |
| AAT | 0.0001 | 39.96 | *** | *** | *** |

TABLE 4-continued

| ANALYTE | P Value | K-W statistic | NI v Lon | NI v Liv | Lon v Liv |
|---|---|---|---|---|---|
| GGT | 0.0001 | 35.35 | *** | ns | *** |
| Total bilirubin | 0.0001 | 34.49 | *** | *** | * |
| Lipase | 0.0001 | 23.04 | * | *** | *** |
| TAS | 0.0006 | 14.81 | ** | ns | ** |
| H. pylori | 0.006 | 14.78 | ** | ns | ns |
| Ferritin | 0.0013 | 13.32 | ** | ns | * |
| CK Nac | 0.0016 | 12.86 | ** | ns | ns |
| Insulin | 0.0051 | 10.57 | * | ns | * |
| FT4 | 0.0064 | 10.1 | ns | * | ns |
| IgG | 0.0065 | 10.08 | ns | * | ns |
| Magnesium | 0.0095 | 9.31 | ** | ns | ns |
| TSH | 0.032 | 6.89 | ns | ns | ns |
| Vitamin D | 0.0318 | 6.89 | ns | * | * |
| IgE | 0.0543 | 5.83 | ns | * | ns |
| Myoglobin | 0.0584 | 5.68 | ns | ns | ns |
| Uric acid | 0.0608 | 5.601 | ns | ns | ns |
| ASO | 0.1026 | 4.55 | ns | ns | ns |
| Vitamin B12 | 0.2033 | 3.19 | ns | ns | ns |
| Rheumatoid factor | 0.2154 | 3.071 | ns | ns | ns |
| Iron | 0.2376 | 2.88 | ns | ns | ns |
| Transferrin | 0.2382 | 2.87 | ns | ns | ns |
| AST | 0.3276 | 2.23 | ns | ns | ns |
| Folic acid | 0.4163 | 1.753 | ns | ns | ns |
| FT3 | 0.4874 | 1.44 | ns | ns | ns |
| Pancreatic amylase | 0.8485 | 0.33 | ns | ns | ns |
| ALP | 0.00001 | NA | *** | NA | NA |

Table 4 shows a Kruskall-Wallis (K-W) comparative analysis of male analytes of ages 18 to 92 years. The abbreviations for the locations are: NI=Northern Ireland; Liv=Liverpool; and Lon=London. The comparative analysis provides the following ratings for differences between the locations. The ratings are: *extremely significant P<0.001, very significant P=0.001 to 0.01, *significant P=0.01 to 0.05, ns=not significant. The P-value corresponds to the probability of results being directly comparable with a rating of ***being least comparable and a rating of ns being most comparable.

The results show that for a number of analytes there is a statistically significant difference between analysis results between each of the three geographic locations for males.

TABLE 5

| ANALYTE | P Value | K-W statistic | NI v Lon | NI v Liv | Lon v Liv |
|---|---|---|---|---|---|
| Glucose | 0.0001 | 23.12 | ** | *** | ns |
| Albumin | 0.0114 | 8.96 | ns | * | ns |
| HbA1c | 0.0047 | 10.73 | ns | * | ns |
| HDL | 0.0028 | 11.77 | * | * | ns |
| Sodium | 0.0001 | 65.07 | *** | *** | *** |
| Cholesterol | 0.0001 | 48.95 | *** | *** | ns |
| WBC | 0.0001 | 21.45 | *** | ns | * |
| Calcium | 0.0001 | 19.56 | ** | ** | *** |
| Creatinine | 0.0001 | 29.13 | ns | *** | *** |
| ALT | 0.0008 | 14.29 | *** | ns | ns |
| Urea | 0.0001 | 28 | ns | *** | ns |
| Cystatin C | 0.0001 | 52.18 | *** | ns | *** |
| CRP | 0.0005 | 15.09 | *** | ns | ** |
| AAT | 0.0013 | 13.23 | * | ns | ** |
| GGT | 0.0885 | 4.85 | ns | ns | ns |
| Total bilirubin | 0.0001 | 27.09 | *** | * | ns |
| Lipase | 0.0001 | 31.28 | *** | *** | ns |
| TAS | 0.0001 | 17.96 | *** | ns | ** |
| H. pylori | 0.052 | 5.91 | ns | ns | ns |
| Ferritin | 0.0199 | 7.84 | ns | ns | * |
| CK Nac | 0.0027 | 11.83 | ns | * | ns |
| Insulin | 0.0005 | 15.33 | *** | ns | ns |
| FT4 | 0.0001 | 22.34 | * | *** | ns |

TABLE 5-continued

| ANALYTE | P Value | K-W statistic | NI v Lon | NI v Liv | Lon v Liv |
|---|---|---|---|---|---|
| IgG | 0.5248 | 1.29 | ns | ns | ns |
| Magnesium | 0.0006 | 14.94 | *** | ns | ns |
| TSH | 0.1773 | 3.46 | ns | ns | ns |
| Vitamin D | 0.0001 | 20.36 | ns | *** | ns |
| IgE | 0.0012 | 13.39 | * | * | ns |
| Myoglobin | 0.2485 | 2.78 | ns | ns | ns |
| Uric acid | 0.1424 | 3.89 | ns | ns | ns |
| ASO | 0.0032 | 11.49 | ** | ns | * |
| Vitamin B12 | 0.3743 | 1.97 | ns | ns | ns |
| Rheumatoid factor | 0.045 | 6.203 | ns | ns | ns |
| Iron | 0.9734 | 0.13 | ns | ns | ns |
| Transferrin | 0.8163 | 0.41 | ns | ns | ns |
| AST | 0.5537 | 1.18 | ns | ns | ns |
| Folic acid | 0.2419 | 2.84 | ns | ns | ns |
| FT3 | 0.8657 | 0.29 | ns | ns | ns |
| Pancreatic amylase | 0.032 | 6.58 | ns | ns | ns |
| ALP | 0.00001 | NA | *** | NA | NA |

Table 5 shows a K-W comparative analysis of female analytes between ages 18 and 92 years. The location abbreviations and statistical ratings are the same as for Table 4.

As with Table 4, Table 5 shows that for a number of analytes there is a statistically significant difference between analysis results between each of the three geographic locations for females.

TABLE 6

| ANALYTE | NI M v F | Lon M v F | Liv M v F |
|---|---|---|---|
| Glucose | *** | *** | *** |
| Albumin | *** | *** | *** |
| HbA1c | *** | *** | ns |
| HDL | *** | *** | *** |
| Sodium | *** | *** | * |
| Cholesterol | ns | ns | ns |
| WBC | ns | ns | ns |
| Calcium | ** | ns | ns |
| Creatinine | *** | *** | *** |
| ALT | *** | *** | *** |
| Urea | *** | *** | *** |
| Cystatin C | *** | *** | *** |
| CRP | *** | ns | ns |
| AAT | *** | *** | ns |
| GGT | *** | *** | *** |
| Total bilirubin | *** | *** | *** |
| Lipase | ns | *** | ns |
| TAS | *** | *** | *** |
| H. pylori | ns | ns | ns |
| Ferritin | *** | *** | *** |
| CK Nac | *** | *** | *** |
| Insulin | *** | *** | *** |
| FT4 | *** | ns | ns |
| IgG | *** | ns | ns |
| Magnesium | *** | *** | ns |
| TSH | ns | ns | ns |
| Vitamin D | ns | ns | ns |
| IgE | *** | ns | ns |
| Myoglobin | ns | ** | * |
| Uric acid | *** | *** | *** |
| ASO | ns | *** | ns |
| Vitamin B12 | ns | ns | ns |
| Rheumatoid factor | ns | * | *** |
| Iron | *** | *** | ** |
| Transferrin | *** | *** | ns |
| AST | *** | *** | *** |
| Folic acid | ** | ns | ns |
| FT3 | *** | *** | ** |
| Pancreatic amylase | ns | ns | ns |
| ALP | *** | *** | NA |

Table 6 shows a Mann-Whitney comparative analysis of analytes obtained from samples of males (M) and females (F) at different locations. The location abbreviations and statistical ratings are the same as in Tables 4 and 5.

As with Tables 4 and 5, Table 6 shows that for a number of analytes there is a statistically significant difference between analysis results for males and females at each of the three geographic locations. This therefore shows that taking account of gender in the comparison is an important factor.

Example 3

This example is an extension of Example 1 and uses the same data. There were samples from 2984 males and 2004 females.

Tables 7 and 8 below show the statistical analysis for Cystatin C with the results showing concentration in mg/L.

TABLE 7

| Statistic | NI | London | Liverpool | All locations |
|---|---|---|---|---|
| Mean | 0.777 | 0.737 | 0.817 | 0.772 |
| SD | 0.141 | 0.138 | 0.179 | 0.143 |
| Median | 0.760 | 0.710 | 0.790 | 0.750 |
| 5% percentile | 0.600 | 0.580 | 0.612 | 0.600 |
| 95% percentile | 1.020 | 0.980 | 1.154 | 1.020 |

Table 7 shows results for males of ages 18 to 92 years. The K-W statistic is 51.00 and the P-value is P<0.0001. The analysis indicates that NI vs London and London vs Liverpool are significantly different.

TABLE 8

| Statistic | NI | London | Liverpool | All locations |
|---|---|---|---|---|
| Mean | 0.724 | 0.657 | 0.739 | 0.717 |
| SD | 0.158 | 0.123 | 0.178 | 0.157 |
| Median | 0.700 | 0.650 | 0.710 | 0.690 |
| 5% percentile | 0.548 | 0.492 | 0.540 | 0.540 |
| 95% percentile | 0.990 | 0.864 | 0.998 | 0.980 |

Table 8 shows results for females of ages 18 to 92 years. The K-W statistic is 52.18 and the P-value is P<0.0001. The analysis indicates that NI vs London and London vs Liverpool significantly different.

In a similar manner to Example 1, we have found that the reference range for males in London may be modified to 0.580 mg/L to 0.980 mg/L, for males in Northern Ireland may be modified to 0.600 mg/L to 1.020 mg/L, for males in Liverpool may be modified to 0.612 mg/L to 1.154 mg/L, for females in London may be modified to 0.492 mg/L to 0.0.864 mg/L, for females in Northern Ireland may be modified to 0.548 mg/L to 0.990 mg/L, and for females in Liverpool may be modified to 0.540 mg/L to 0.998 mg/L. This is achieved by applying the 5th and 95th percentile method outlined above. The reference range achieved by applying the mean+/−2SD as the lower and upper bounds of the range can be calculated from the table.

These modified reference ranges again provide a more precise minimum and maximum than the standard range. Additionally, these ranges provide a different range for each location for males and females patients. As such, this causes each of these locations to be assessed under different criteria appropriate to their differences. This is instead of a comparison being conducted against a generic range that may not fully represent the patient. This is again demonstrated by male and female patients in one location being considered to fall within the modified range in that location and outside the modified range in a different location when their sample is found to have particular concentrations of Cystatin C. This would allow patients to be considered to be outside or inside the healthy range for their location, and would therefore benefit from further tests to assess their health when considered to be outside of the local healthy range when that may not have been the case if a standard range were applied. For comparative purposes this example shows the data for all locations for males and females, which is the data used in Example 1.

Age Related Reference Data

As with geographic location, we have found that the reference ranges for certain endogenous biochemicals are age dependent and that a further adjustment of the reference ranges by age category can further increase the accuracy of an individual's health assessment. Accordingly, in some examples the PMLQ includes age information. In those examples, the patient's analysis results are then able to be compared against biological sample analysis results obtained from individuals within the same age cohort as the patient. This allows a more accurate and precise classification of the patient's results.

Additionally, the data derived from the group of biological samples of individuals having the same gender and same age cohort as the patient and not having a need for medical treatment for a disease or illness may be used to modify predetermined boundaries between classifications of healthy, pre-diseased, diseased and/or at risk of disease. The modification of the boundaries is based on a statistical analysis of analyte quantities of biological samples of the individuals with the same age cohort as the patient.

Examples 4 below sets out how using data from individuals of different ages allows the boundary between classifications to be adjusted.

Example 4

Examples 1 and 3 detail the K-W analysis of patient Cystatin C levels varying according to sex and location for individuals aged between 18 and 92 years. In this example, K-W analysis of patient Cystatin C levels vary according to location for age groups 18 to 92 is conducted. Although all the patients used in the analysis did not have recognised pathologies, to account for possible age-related confoundment of the results, a further consolidatory analysis was conducted on a healthy patient cohort that did not exhibit age-related change in cystatin C levels.

For age groups from 25-49 (which breaks down into cohorts of 25 to 29, 30 to 34, 35 to 39, 40 to 44 and 45 to 49) it was found that the Cystatin C analyte is stable in its concentration (in other words there is not a statistically significant different between these age groups) within a location/clinic (i.e. within the clinics in NI, LON and LIV).

As in Examples 1 to 3, this data represents "healthy" individuals in that they did not have any underlying health conditions as reported on the PMLQ and as verified by their Randox Health clinic at a health check appointment when a sample was obtained.

The K-W analysis with Dunn's Multiple Comparison Test of ages 24-49 for the three clinics shows NI and London to be significantly different (K-W statistic 21.85; P<0.0001) as shown below in Tables 9 and 11, and Tables 10 and 12 for males and females respectively.

TABLE 9

| Statistic | NI | London | Liverpool | All locations |
| --- | --- | --- | --- | --- |
| Mean | 0.740 | 0.713 | 0.730 | 0.735 |
| SD | 0.107 | 0.118 | 0.094 | 0.110 |
| Median | 0.73 | 0.70 | 0.72 | 0.72 |
| 5% percentile | 0.590 | 0.570 | 0.581 | 0.590 |
| 95% percentile | 0.930 | 0.891 | 0.928 | 0.930 |

Table 9 shows data for male individuals. The K-W statistic is 21.85, and the P-value is P<0.0001. The results for NI vs London and London vs Liverpool are significantly different.

TABLE 10

| Statistic | NI | London | Liverpool | All locations |
| --- | --- | --- | --- | --- |
| Mean | 0.678 | 0.626 | 0.699 | 0.672 |
| SD | 0.101 | 0.089 | 0.126 | 0.103 |
| Median | 0.670 | 0.615 | 0.690 | 0.660 |
| 5% percentile | 0.524 | 0.490 | 0.531 | 0.520 |
| 95% percentile | 0.870 | 0.793 | 0.925 | 0.860 |

Table 10 shows data for female individuals. The K-W statistic is 36.52, and the P-value is P<0.0001. The results for NI vs London and London vs Liverpool are significantly different.

It can be seen from the Table 9 for example, that if the reference range was set using All locations (NI+London+Liverpool) an individual in London with a Cystatin C level of 0.920 would be classified as healthy using the percentile-based reference range, whereas the London reference range, taking into account geographical differences, would more accurately classify the individual as outside of the healthy range.

Turning to the age groups of ages 65 to 92, the analysis is as set out in Tables 11 and 12 below.

TABLE 11

| Statistic | NI | London | Liverpool | All locations |
| --- | --- | --- | --- | --- |
| Mean | 0.919 | 0.838 | 0.937 | 0.915 |
| SD | 0.214 | 0.241 | 0.219 | 0.219 |
| Median | 0.87 | 0.88 | 0.88 | 0.87 |
| 5% percentile | 0.678 | 0.524 | 0.648 | 0.657 |
| 95% percentile | 1.384 | 1.539 | 1.713 | 1.372 |

Table 11 shows data for male individuals. The K-W statistic is 3.560, and the P-value is P=0.169. The results for NI vs London and London vs Liverpool are not significantly different.

TABLE 12

| Statistic | NI | London | Liverpool | All locations |
| --- | --- | --- | --- | --- |
| Mean | 0.943 | 0.0.836 | 0.904 | 0.933 |
| SD | 0.286 | 0.253 | 0.320 | 0.287 |
| Median | 0.85 | 0.82 | 0.79 | 0.85 |
| 5% percentile | 0.631 | 0.450 | 0.680 | 0.620 |
| 95% percentile | 1.606 | 1.430 | 1.770 | 1.590 |

Table 12 shows data for female individuals. The K-W statistic is 2.548, and the P-value is P=0.279. The results for NI vs London and London vs Liverpool are not significantly different.

As can be seen from Tables 11 and 12, gender Cystatin C levels for ages 65-92 were not statistically different between clinic locations.

Taking age into account allows the reference ranges to be modified in the same manner as set out in Examples 1 and 3. The modified ranges able to be derived from the data above in Example 4 in the same manner as derived in Examples 1 and 3 provide a more precise minimum and maximum than the standard range for different age groups. Additionally, these ranges provide a different range for each location and age group for males and females patients using each of these locations. This allows individuals to be assessed under different criteria appropriate to their differences instead of against a generic range that may not fully represent them. This would enable patients to be considered to be outside or inside the healthy range for their location, and would therefore benefit from further tests to assess their health when considered to be outside of the local healthy range when that may not have been the case if a standard range were applied.

Personal Biochemical Baseline

When a first sample is obtained from a patient, standard biochemical reference ranges from a population sample are generally used to assess biochemical concentrations in a patient upon which a health assessment is made. However, with repeat biochemical testing data a personalised biochemical baseline (PBB) can be constructed for each biochemical.

A PBB provides an accurate metric for an individual that allows for optimised clinical decision making. For example, this can prevent a clinician from diagnosing a healthy individual as unhealthy and thus not unnecessarily prescribing a counteractive drug, saving costs and preventing potential drug side-effects.

Figure 2A:
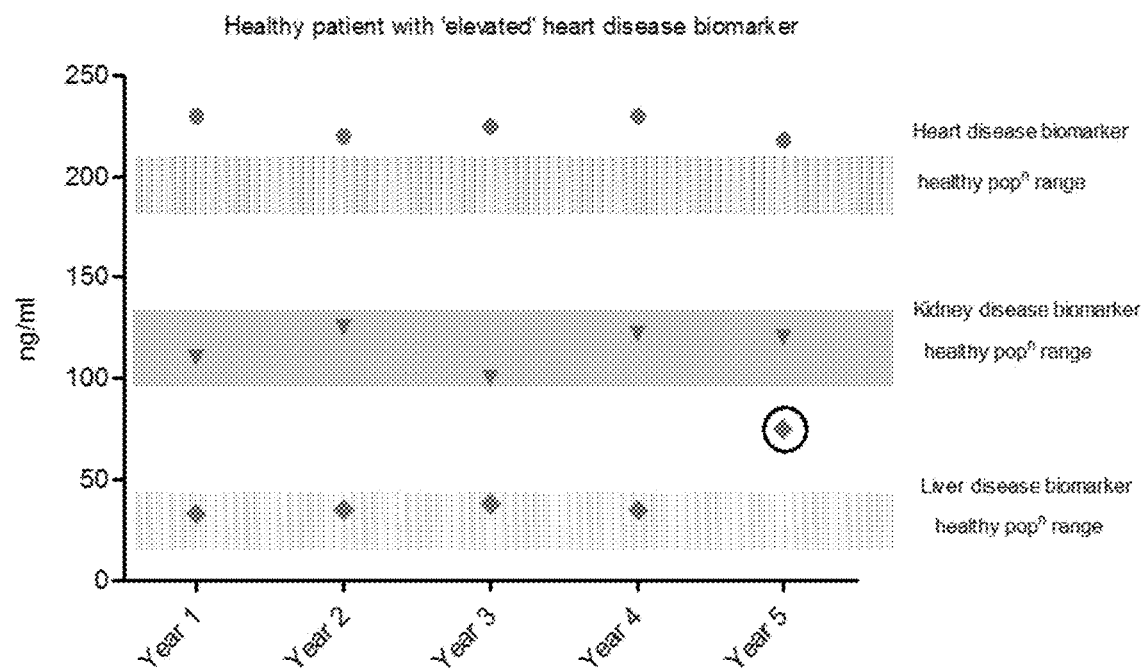
FIG. 2A shows a graph relating to the biological status of an individual.

The example shown in FIG. 2A shows an example of a PBB for a patient. In this figure a graph showing a series of test results for three analytes (a heart disease biomarker, a kidney disease biomarker, such as Cystatin C, and a liver disease biomarker) over a series of five testing rounds administered on an annual basis, meaning the results cover a period of five years. The concentration of each analyte in nanograms per millilitre (ng/mL) obtained from the sample is also provided in FIG. 2A.

The results shown in FIG. 2A are obtained using the sample obtaining and analysis processes set out above in relation to FIG. 1. Each new sample obtained annually is added to the patient's history to build up their PBB. Once a minimum of two samples have been analysed, a PBB is able to be established. This allows a patient reference value to be established. This is able to be established, for example, by averaging the quantities of an analyte for each analyte analysed. Alternatively or additionally the patient reference value includes details of the presence or absence of one or more analytes (such as two or more analytes).

In the example shown in FIG. 2A, for years 1 to 4 each of the kidney disease biomarker and the liver disease biomarker fall within the reference range for the respective analyte for a healthy individual. This reference range in some examples is the standard reference range for the population. In other examples this reference range is a modified reference range based on a group of biological samples of healthy individuals. The reference ranges shown in FIG. 2A are depicted by the shaded sections. The liver disease biomarker can be seen to fall inside the reference range due to the diamond shaped points on the graph being within the relevant reference range shown. The kidney disease biomarker can be seen to fall inside the reference range due to the triangular shaped points on the graph being within the relevant reference range shown.

Unlike the kidney disease and liver disease biomarker points falling within the relevant reference ranges (in at least years 1 to 4), it can be seen from FIG. 2A that the heart disease biomarker for the individual whose results are shown in the graph are outside (above) the reference range for the heart disease biomarker. This can be seen by the circular shaped points being outside of relevant range shown. When this occurs when the first sample is taken from a patient, the patient is assessed to identify if they are diseased, pre-diseased or at risk of disease. Should the patient be determined as being healthy (or not diseased, pre-diseased or at risk of disease), the result is added to the patient reference value (for example as part of the patient's PBB).

When the patient's PBB is assessed, it is apparent that their natural level for the heart disease biomarker is higher than the reference range, and therefore higher than the general population while still being healthy. This is further demonstrated by FIG. 2B. This figure shows the anticipated distribution of the concentration of the heart disease biomarker in the general population. This is a bell curve with its centre (and therefore mean) at 195 ng/mL. The bell curve has a distribution such that the −3SD (negative three standard deviation) is at 150 ng/mL, the −2SD is at 165 ng/mL, the −1SD is at 180 ng/mL, the +1SD (positive one standard deviation) is at 210 ng/mL, +2SD is at 225 ng/ml and the +3CD is at 240 ng/mL. Based on this distribution, the healthy range would be expected to be 165 ng/mL to 225 ng/mL when applying the mean+/−2SD methodology.

Figure 2B:
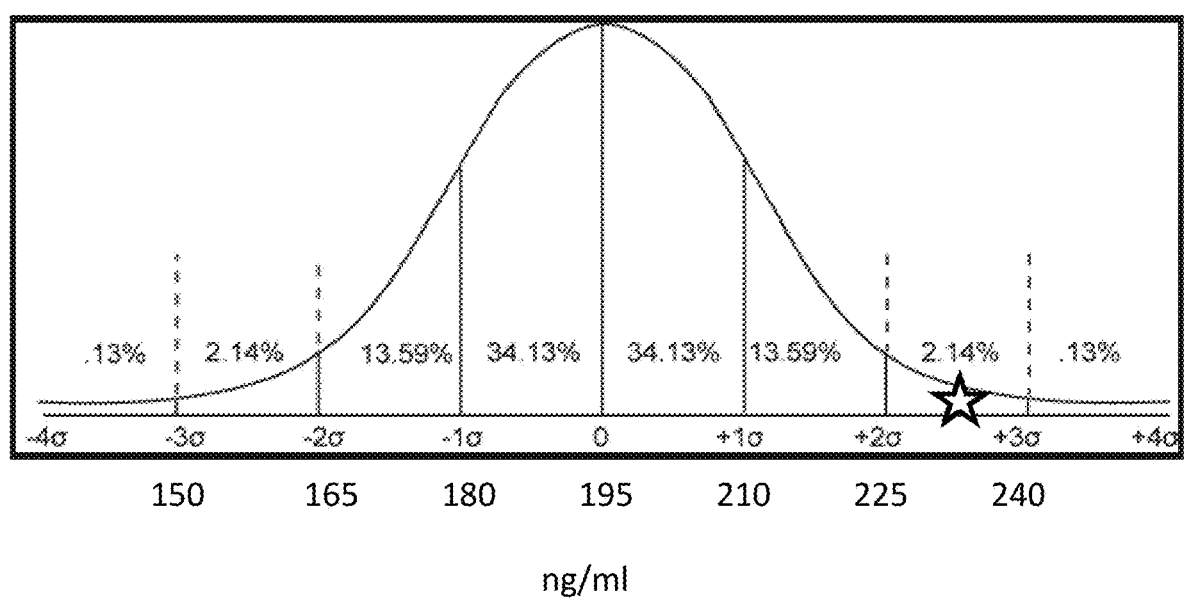
FIG. 2B shows a graph of the individual's biological status compared to other results for the same analyte.

The patient whose results are shown in FIG. 2A is a healthy 30 year old. FIG. 2B shows their patient reference value for a heart disease biomarker. In this example, this is the mean of the concentrations of the heart disease biomarker from the samples obtained over the five year period. This value is about 235 ng/mL and is identified on FIG. 2B as a star between +2SD and +3SD.

Returning to FIG. 2A, in years 1 to 5, the kidney disease and heart disease biomarkers can be seen to be relatively stable (i.e. they do not vary significantly). On the other hand, in year 5, the liver disease biomarker can be seen as elevated. This can be seen by the circled diamond shaped point in FIG. 2A. Since the patient PBB is in place, it can be seen that this elevated biomarker is not consistent with the patient's previous results. This allows a quick response when the results are produced from the analysis of the sample, for example to provide re-testing and/or to carry out further medical assessments and/or suitable treatment.

A further example of a PBB being of use to a patient can be seen from Example 5.

Example 5

In this example a patient, who is a clinically-verified healthy 40 year-old male with no medication needs and a disease-free history of normal BMI, was tested using the process set out in relation to FIG. 1. Biological samples provided by the patient at regular (annual) intervals over three years. Each sample was analysed for cholesterol quantities. The quantity of cholesterol was found to range between 6.87 millimoles per Litre (mmol/L) and 7.41 mmol/L, with an average of 7.12 mmol/L. This is considered to be outside the healthy reference range for cholesterol. The patient therefore underwent further medical testing. This included echocardiography and vascular ultrasound. There was no indication of atherosclerosis. Accordingly, the patient was able to be classified as healthy and the cholesterol results over the three year period are able to be used as part of a PBB for the patient, indicating that they are healthy and have a naturally elevated level of cholesterol, avoiding the need to statin therapy.

In some examples, as the patient's history (for example within their PBB) is built up over time, statistical analysis can be conducted on the results for each analyte to allow the patient's own (i.e. personal) reference range to be established. This would allow smaller changes from the statistical norm for the patient to be identified and investigated, which could lead to early diagnosis of a disease and therefore assist with treatment and likelihood of recovery.

When undergoing further testing, regardless of the type of patient reference value, PBB or statistical analysis applied to the patient's results, the further testing is able to include one or more of ultrasound, CT scan, X-ray and MRI scans for example.

A further use of the PBB, as well as the use of geographic data as detailed above, is that geographical reference ranges and a full PBB can be used to develop a geographical genotype as well as a personal biochemical baseline. This results in individualised anticipated average concentrations of one or more or two or more analytes. The geographical environment and geographic genotype interaction (for example the interaction between environmental factors and biological traits prevailing in a particular area or region) can affect the average concentrations, presence or absence of certain analytes between individuals from different locations. Due to modern world commerce the effect of diet, especially on more affluent, health conscious individuals of a similar demographic background is unlikely to be significant. However, vehicle and industrial pollution are considered to play a role causing differences between city dwellers compared to pesticide and industrial pollution for country dwellers. However, geographic genotypic factors are considered to have the most influential contribution. Accordingly, an individual visiting a clinic to undergo the procedures described herein is also able to have the birth location (such as town of birth) taken into account to allow the most suitable geographical and clinical reference ranges taken into account, such as by being part of the PMLQ. An advantage of the model used to obtain patient samples described herein is the ability to apply the most suitable geographical reference range to an individual each time they provide a sample. This leads to more valid results and a more accurate healthcheck. Ultimately, if an individual is, for example, an annual visitor, the establishment of a PBB would dispense with this requirement since the individual's history will be well known.

Healthcare Model

Biological samples are highly complex entities, comprising a multitude of cellular, protein, small molecule components as well as a number of other components. Biological sample compositions fluctuate under non-homogeneous environmental conditions and with time. Current diagnostic healthcare models do not optimise sample handling and it is common for a biological sample to be extracted at one location, stored for a period at that location, before being transited to a different destination, stored, and finally analysed. From intra-sample and inter-sample perspectives, such non-standardised processes inevitably result in sample compositional changes between the initially extracted sample and the analysed sample, potentially compromising patient healthcare decisions. On-site analyser placement mitigates these impacts and ensures minimal or no storage between sample extraction from the patient and sample analysis. Accordingly, we have found that providing on-site analysis provides results with improved accuracy and consistency.

We have found that such a model also benefits from having nutritional and fitness facilities available at the same site as where the patient sample is obtained and analysed. Such a model is generally illustrated at 10 in FIG. 3, and may be usable for putting the examples described herein, such as the example of FIG. 1 into effect.

Figure 3:
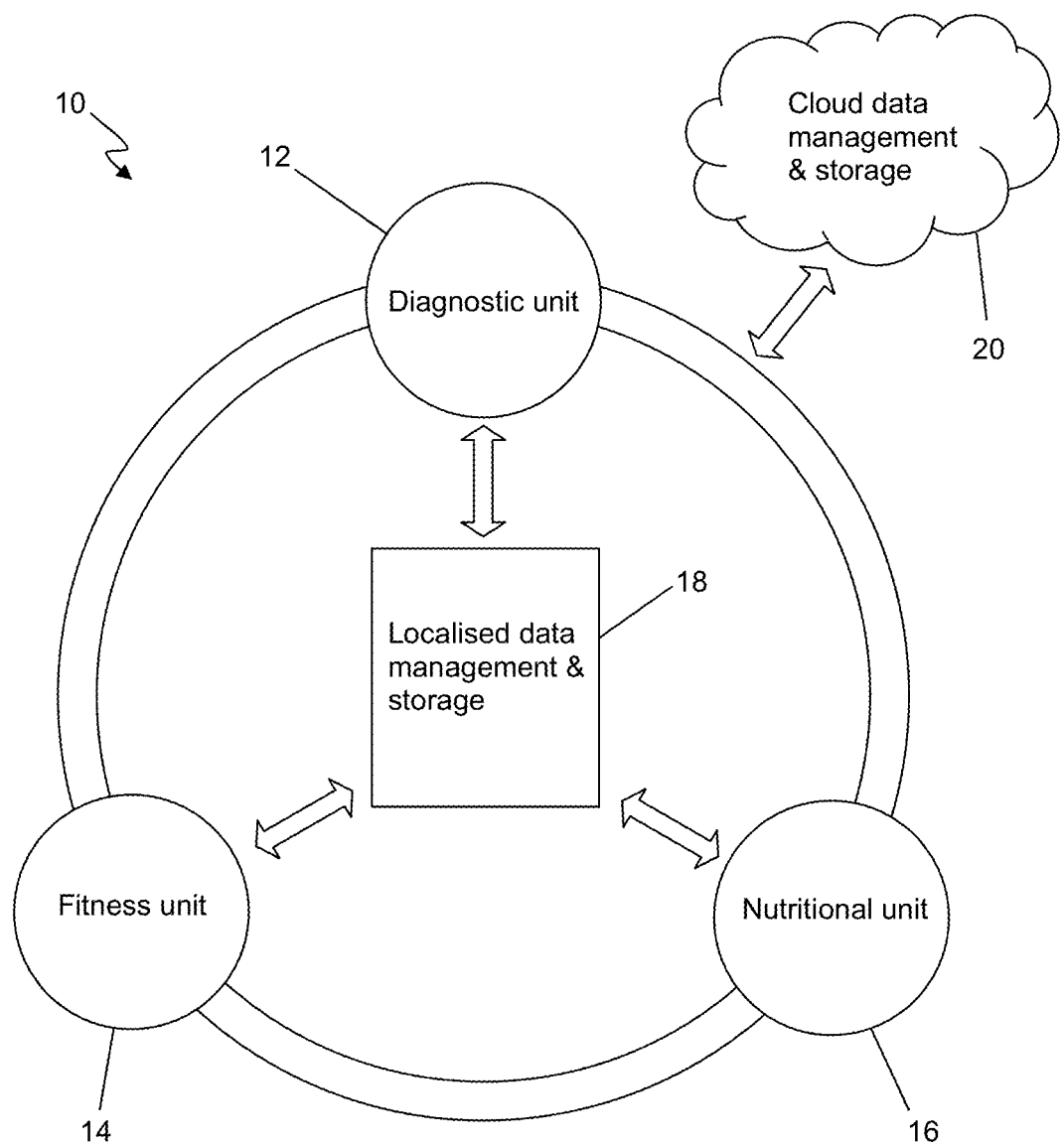
FIG. 3 shows a schematic of a preventative healthcare model usable in classification of biological status.

The example shown in FIG. 3 has a diagnostic unit 12, fitness unit 14 and nutritional unit 16 located on the same site. The diagnostic unit analyses patient samples that are also collected on the site. The fitness unit in this example is a health and fitness centre, such as a gym and/or spa, swimming pool, athletics facility or other fitness facilities. The nutritional unit in this example is a facility where an individual is able to be provided with nutritional information and advice.

These units further enhance wellbeing provision to the individual by providing a co-located diagnostic clinic, a fitness and/or nutritional unit (the three arms represent "wellbeing units"). This co-location of a fitness and/or nutritional unit enables the individual to readily access services which can support a response to the biochemical testing results thus ensuring optimal wellbeing provision. Computer, electronic device and data from the wellbeing units are fully integrated. This is shown in FIG. 3 by the localised data management and storage 18 in the form of an on-site server based system for data-storage at the location of the wellbeing units. Additionally, the co-location of the wellbeing units enables the use of cloud data management and storage 20. The on-site server based system for data-storage benefits from increased data-security when confined to data acquisition and management at a restricted local level.

The co-location of the three wellbeing units provides various advantages. Both individuals and business both benefit from financial savings. The individuals also benefits from the convenience of previously discrete enterprises being co-located. Importantly, the configuration supports increased well-being by encouraging and facilitating an individual to adopt a comprehensive preventative healthcare lifestyle as opposed to being a discrete gym or healthcare clinic attendee. Such an approach as well as benefiting the individual has far reaching positive societal impacts by reducing sick days, increasing productivity and reducing the stress on public healthcare bodies such as the NHS.

The invention claimed is:

1. In a method of treating an individual in which a first biological sample of the individual obtained at a first time and a second biological sample of the individual obtained at a second time are analysed to identify a quantity of each of 2 or more analytes in the first and second samples and the analyte quantities in the first and second samples are compared to a first reference range of first reference data and a second reference range of second reference data, respectively, to classify the individual as healthy, pre-diseased, at risk of disease or diseased for at least one health-related condition, and upon finding the individual is pre-diseased, at risk of disease, or diseased, applying an appropriate medical treatment to the individual, the improvement comprising:

obtaining health-related information from the patient at the first time and at the second time, wherein the health-related information at the first time comprises an indication of a first geographic location and wherein the health-related information at the second time comprises an indication of a second geographic location which is different from the first geographic location, wherein the first geographic location has a first diagnostic unit for analysing the first biological sample obtained at the first time and the second geographic location has a second diagnostic unit for analysing the second biological sample obtained at the second time, wherein the first reference range is a geographically-specific reference range corresponding to the first geographic location, and the first reference data is derived from a first group of biological samples of individuals having the same gender as the individual and not having a need for medical treatment for a disease or illness, each biological sample of the first group of biological samples having been analysed by the same process and using the same first diagnostic unit as used to analyse the first biological sample, wherein each biological sample of the first group of biological samples is a biological sample obtained from individuals at the first geographic location, and wherein the first geographic location is a home region of the individual, wherein the second reference range is a geographically-specific reference range corresponding to the second geographic location, and the second reference data is derived from a second group of biological samples of individuals having the same gender as the individual and not having a need for medical treatment for a disease or illness, each biological sample of the second group of biological samples having been analysed by the same process and using the same second diagnostic unit as used to analyse the second biological sample, and wherein each biological sample of the second group of biological samples is a biological sample obtained from individuals at the second geographic location, and wherein the second geographic location is not a home region of the individual.

2. The method according to claim 1, wherein the health-related information includes age, and the individual is in the same age cohort of the individuals of the group of biological samples.

3. The method according to claim 1, wherein the analyte quantities in the first and second samples comprise quantities of one or more endogenous analytes selected from the group consisting of Glucose, Albumin, HbA1c, HDL, Sodium, Cholesterol, WBC, Calcium, Creatinine, ALT, Urea, Cystatin C, CRP, AAT, GGT, Total bilirubin, Lipase, TAS, *H. pylori*, Ferritin, CK Nac, Insulin, FT4, IgG, Magnesium, TSH, Vitamin D, IgE, Myoglobin, Uric acid, ASO, Vitamin B12, Rheumatoid factor, Iron, Transferrin, AST, Folic acid, FT3, Pancreatic amylase, and ALP, and wherein for endogenous analytes glucose, sodium, cholesterol, WBC, calcium, ALT, cystatin C, CRP, AAT, total bilirubin, lipase, TAS, albumin, HbA1c, HDL, urea, insulin, and magnesium the reference range values assigned to each endogenous analyte corresponds to upper and lower values of the 95% percentile calculated from biological samples of the group of biological samples.

4. The method according to claim 1, further comprising: when the method indicates the individual is pre-diseased, at risk of disease or diseased, analysing a further biological sample obtained from the individual after a predetermined time interval.

5. The method according to claim 1, wherein the analyte quantities in the first and second samples comprise one or more exogenous analytes, wherein classifying the individual as healthy, pre-diseased, at risk of disease or diseased for at least one health-related condition comprises classifying, based upon the presence, absence or a concentration of biochemicals in the sample, the individual as disease free without exogenous contaminant, disease free with exogenous toxic biochemical, pre-disease without exogenous toxic biochemical, pre-disease with exogenous toxic biochemical, disease present without exogenous toxic biochemical or disease present with exogenous toxic biochemical.

6. The method according to claim 1, wherein each of the first and second diagnostic units are co-located with a respective fitness unit or nutritional unit.

7. The method according to claim 1, wherein each of the first and second diagnostic units comprise one or more analysers for analysing the first and second biological samples, each analyser used for a specific analyte in each respective sample being of the same model analyser, and wherein:

(a) each analyser used for the specific analyte is the same analyser as used for a previous analysis of the specific analyte in a sample from the same individual;

(b) each analyser used for the specific analyte is derived from a single manufacturer; or (c) the reagents used during sample analysis are derived from a same single manufacturer.

8. The method according to claim 1, wherein when sample analysis is to transition from a first analyser to a further analyser, the same model analyser or a newer model of the analyser is used as the further analyser, and wherein one or more samples from one or more individuals that have been analysed on the first analyser are further analysed on the further analyser.

9. The method of claim 4 further comprising: obtaining health-related information from the individual again after the predetermined time interval.

10. The method of claim 5 further comprising: referring to a nutritional and personal care specialist an individual who is classified as disease free with exogenous toxic biochemical or pre-disease with exogenous toxic biochemical.

11. The method of claim 1, wherein when the individual is classified as pre-diseased, at risk of disease, or diseased based on the analysis, the individual is put on a healthcare regime provided by a medical professional based on the identified quantity of one or more of the analytes.

* * * * *